(12) United States Patent
Roth et al.

(10) Patent No.: US 8,083,423 B2
(45) Date of Patent: Dec. 27, 2011

(54) THERMAL INDICATORS

(75) Inventors: Joseph D. Roth, Springboro, OH (US);
Wendell B. Halbrook, Jr., Waynesville, OH (US)

(73) Assignee: NCR Corporation, Duluth, GA (US)

( * ) Notice: Subject to any disclaimer, the term of this patent is extended or adjusted under 35 U.S.C. 154(b) by 1043 days.

(21) Appl. No.: 11/365,190

(22) Filed: Mar. 1, 2006

(65) Prior Publication Data
US 2007/0206982 A1    Sep. 6, 2007

(51) Int. Cl.
B41J 2/315    (2006.01)

(52) U.S. Cl. .............................. 400/120.01; 400/120.18

(58) Field of Classification Search ............. 400/120.01, 400/120.18
See application file for complete search history.

(56) References Cited

U.S. PATENT DOCUMENTS

| | | | |
|---|---|---|---|
| 3,663,390 A * | 5/1972 | Fergason et al. ......... 204/157.65 |
| 3,947,854 A | 3/1976 | Hansen et al. |
| 4,167,392 A | 9/1979 | Defago |
| RE30,116 E | 10/1979 | Maalouf |
| 4,309,255 A | 1/1982 | Gendler et al. |
| 4,507,669 A | 3/1985 | Sakamoto et al. |
| 4,708,500 A | 11/1987 | Bangs et al. |
| 4,956,251 A | 9/1990 | Washizu et al. |
| 4,965,166 A | 10/1990 | Hosoi et al. |
| 5,055,373 A | 10/1991 | Saeki et al. |
| 5,101,222 A | 3/1992 | Hakkaku |
| 5,132,704 A | 7/1992 | Nakagawa |
| 5,196,297 A | 3/1993 | Dombrowski, Jr. et al. |
| 5,214,750 A | 5/1993 | Minowa et al. |
| 5,266,550 A | 11/1993 | Asajima et al. |
| 5,284,816 A | 2/1994 | Stephenson |
| 5,398,305 A | 3/1995 | Yawata et al. |
| 5,428,714 A | 6/1995 | Yawata et al. |
| 5,437,004 A | 7/1995 | Miyasaka et al. |
| 5,555,349 A | 9/1996 | Miyasaka et al. |
| 5,584,590 A | 12/1996 | Ito et al. |
| 5,594,653 A | 1/1997 | Akiyama et al. |
| 5,618,063 A * | 4/1997 | Chang et al. .................... 283/67 |
| 5,629,259 A | 5/1997 | Akada et al. |
| 5,639,169 A | 6/1997 | Aruga |
| 5,667,303 A | 9/1997 | Arens et al. |
| 5,677,722 A | 10/1997 | Park |
| 5,692,110 A | 11/1997 | Miyasaka et al. |
| 5,707,925 A | 1/1998 | Akada et al. |

(Continued)

FOREIGN PATENT DOCUMENTS
EP    0947340    10/1999
(Continued)

OTHER PUBLICATIONS
JP Abstract, vol. 007, No. 063 (M-200), Mar. 16, 1983 & JP 57-208298 A (Ricoh KK), Dec. 21, 1982.

(Continued)

*Primary Examiner* — Anthony Nguyen
(74) *Attorney, Agent, or Firm* — Schwegman, Lundberg & Woessner, P.A.

(57) ABSTRACT

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

14 Claims, 3 Drawing Sheets

U.S. PATENT DOCUMENTS

| | | | |
|---|---|---|---|
| 5,710,094 A | | 1/1998 | Minami et al. |
| 5,712,673 A | * | 1/1998 | Hayashi et al. ............... 347/217 |
| 5,755,521 A | | 5/1998 | Ito et al. |
| 5,756,188 A | | 5/1998 | Reiter et al. |
| 5,763,356 A | | 6/1998 | Ueno et al. |
| 5,789,340 A | | 8/1998 | Brust et al. |
| 5,792,725 A | | 8/1998 | Simpson et al. |
| 5,794,530 A | | 8/1998 | Dobashi et al. |
| 5,800,081 A | | 9/1998 | Teradaira et al. |
| 5,815,191 A | | 9/1998 | Michielsen et al. |
| 5,846,900 A | | 12/1998 | Reiter et al. |
| 5,873,604 A | * | 2/1999 | Phillips ........................ 283/70 |
| 5,876,836 A | | 3/1999 | Imamura et al. |
| 5,883,043 A | | 3/1999 | Halbrook, Jr. et al. |
| 5,886,725 A | | 3/1999 | Miyadera et al. |
| 5,918,910 A | | 7/1999 | Stillwagon et al. |
| 5,964,541 A | | 10/1999 | Murison et al. |
| 6,042,264 A | * | 3/2000 | Prusik et al. .................. 374/106 |
| 6,095,414 A | | 8/2000 | Long et al. |
| 6,130,185 A | | 10/2000 | Narita et al. |
| 6,150,067 A | | 11/2000 | Koike et al. |
| 6,210,777 B1 | | 4/2001 | Vermeulen et al. |
| 6,241,386 B1 | * | 6/2001 | Limburg et al. ............... 374/162 |
| 6,326,071 B1 | * | 12/2001 | Francoeur .................... 428/40.1 |
| 6,388,692 B1 | | 5/2002 | Iwata et al. |
| 6,524,000 B1 | | 2/2003 | Roth |
| 6,544,925 B1 | | 4/2003 | Prusik et al. |
| 6,562,755 B1 | | 5/2003 | Halbrook, Jr. et al. |
| 6,752,430 B2 | * | 6/2004 | Holt et al. ........................ 283/72 |
| 7,514,262 B2 | * | 4/2009 | Ribi ................................. 436/2 |
| 2002/0124950 A1 | * | 9/2002 | Klima, Jr. ..................... 156/256 |
| 2003/0031861 A1 | * | 2/2003 | Reiter et al. .................. 428/343 |

FOREIGN PATENT DOCUMENTS

| | | |
|---|---|---|
| GB | 2 250 478 | 6/1992 |
| WO | WO 2004/077001 | 9/2004 |

OTHER PUBLICATIONS

JP Abstract, vol. 007, No. 081 (M-105), Apr. 5, 1983 & JP 58-008668 A (Shinko Denki KK), Jan. 18, 1983.

JP Abstract, vol. 015, No. 194 (M-1114), May 20, 1991 & JP 03-051149 A (Fujitsu General Ltd.), Mar. 5, 1991.

JP Abstract, vol. 2000, No. 24, May 11, 2001 & JP 2001-199095 A (Alps Electric Co. Ltd.), Jul. 24, 2001.

JP Abstract, vol. 1998, No. 08, Jun. 30, 1998 & JP 10-076713 A (Sony Corp.), Mar. 24, 1998.

JP Abstract, vol. 010, No. 151 (M-483), May 31, 1986 & JP 61-003765 A (Konishiroku Shashin Kogyo KK), Jan. 9, 1986.

JP Abstract, vol. 016, No. 041 (M-1206), Jan. 31, 1992 & JP 03-246091 A (Canon Inc.), Nov. 1, 1991.

Boca Systems Micro Plus 2S 2 Sided Printer product brochure which came to the attention of Applicant at a Chicago tradeshow during the summer of 2002.

\* cited by examiner

THERMAL INDICATORS

BACKGROUND

Direct thermal printing is a recognized means of printing quietly without toners or inks. It is a relatively mature technology that has been around for over forty years. Its use by retailers for printing of cash register receipts, mailing labels, etc. is now commonplace.

In direct thermal printing, a print head selectively applies heat to paper or other sheet media comprising a substrate with a thermally sensitive coating. The coating changes color when heat is applied, by which "printing" is provided on the coated substrate. For dual-sided direct thermal printing, the sheet media substrate may be coated on both sides.

Time-temperature indicators using thermally sensitive color change materials are well known. For example, indicator devices that relay on diffusion of a dye through a polymer are described in U.S. Pat. Nos. 6,214,623; 5,746,792; 5,057,434; and 4,212,153.

SUMMARY

A thermal indicator using indicia formed by opaque ink applied to a thermal imaging material element is described. The ink is substantially the same color as the imaging element background and remains substantially hidden until the imaging element background changes color when heated. Time-temperature exposure indicating labels can be prepared using a printer with direct thermal type and ink jet type print heads.

Other features, advantages and variations of the invention will be apparent from the following description and the appended drawings and claims.

DESCRIPTION

By way of example, various embodiments of the invention are described in the material to follow with reference to the included drawings. Variations may be adopted.

Figure 1:
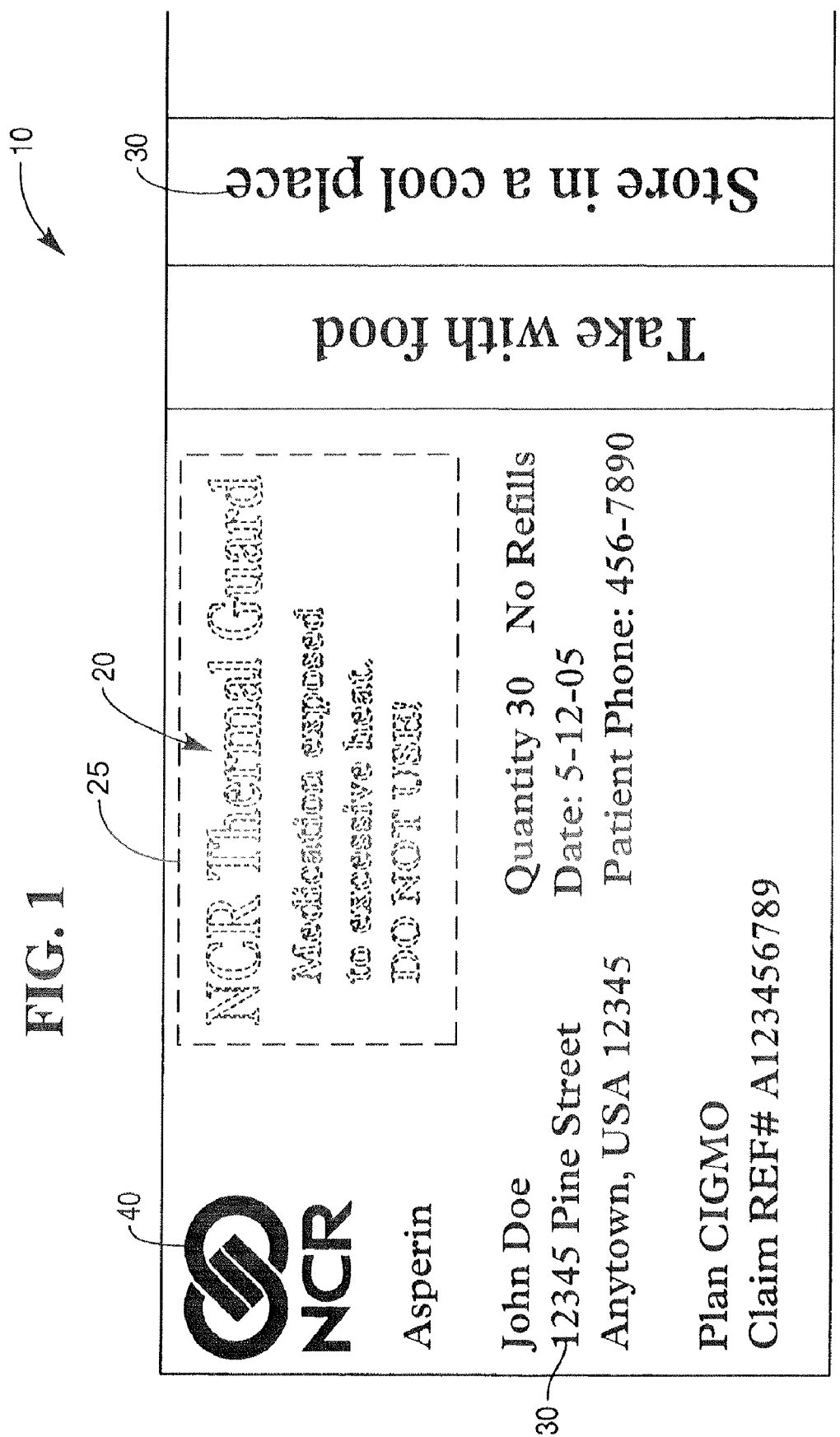
FIG. 1 illustrates a thermally sensitive label with hidden opaque printing before exposure to excessive heat.

FIG. 1 illustrates a thermally sensitive label 10 with hidden opaque printing 20 before exposure to excessive heat. The label 10 comprises a substrate with one or more thermally sensitive coatings, e.g., permitting direct thermal printing 30 on the label 10 in a manner well known in the art. The label 10 may also include printed material such as a logo 40 added by direct thermal printing, inkjet printing, lithographic process, flexographic printing or the like. Conventional direct thermal printing paper can be used for the exemplary labels 10.

In the example shown in FIG. 1, the initial background color of the label 10 is white. The hidden opaque printing 20 would match this background color so as to be essentially invisible before the label 10 is exposed to excessive heat. In this example the color of the opaque printing 20 would be white. The visibility of the hidden opaque printing 20 in FIG. 1 is for illustration only, where again the opaque printing 20 would be substantially invisible in actual practice against the background of the label 10. The hidden printing 20 could be added to the label 10 by inkjet printing, for example.

Figure 2:
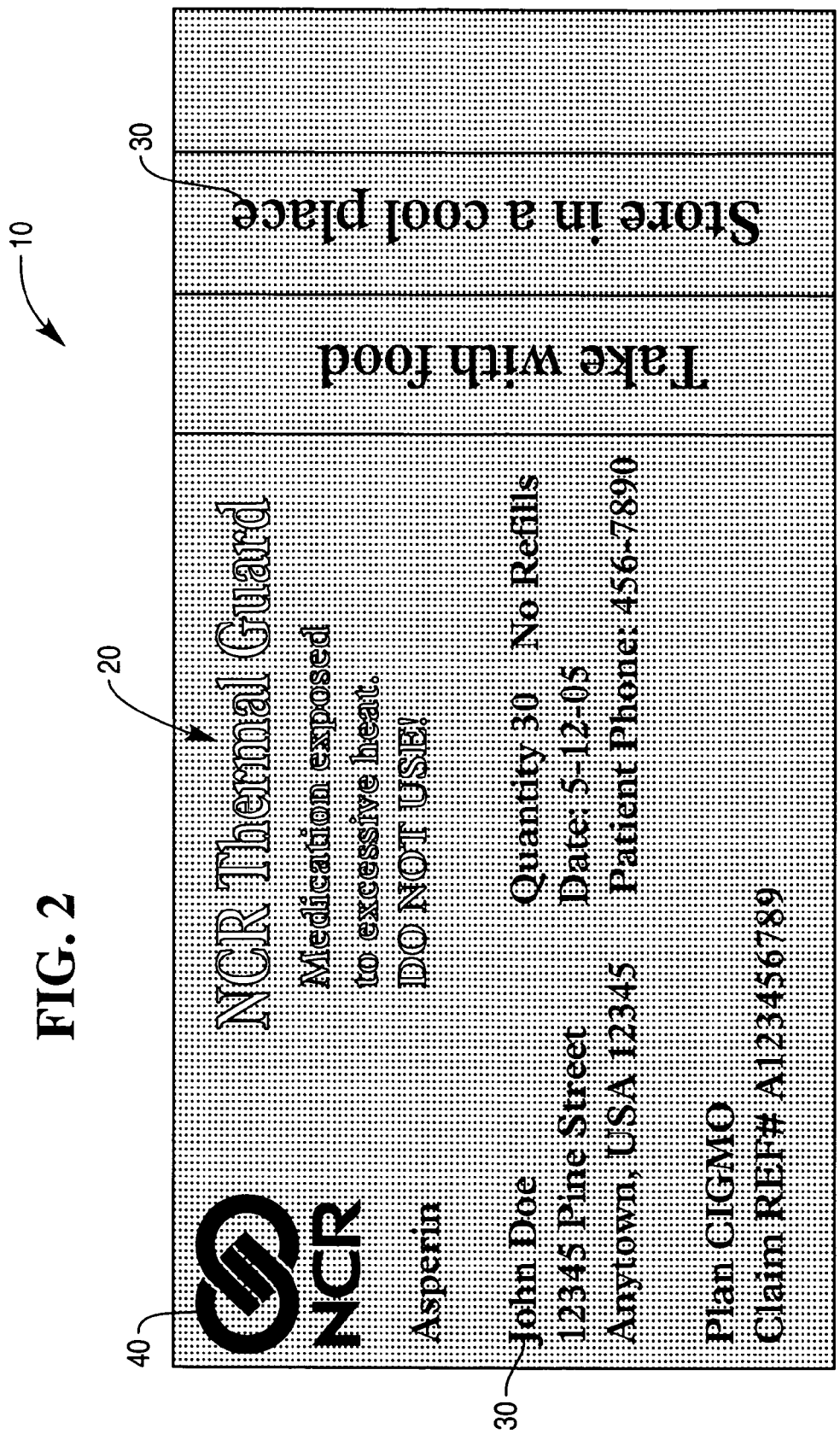
FIG. 2 illustrates the thermally sensitive label of FIG. 1 following exposure to excessive heat, where the opaque printing has been made visible.

When the label 10 is exposed to excessive heat, the background color of the label 10 turns dark, as shown in FIG. 2, exposing the opaque printing 20 and rendering it visible, e.g., to reveal a message. The illustrated label 10 in FIGS. 1 and 2 could be used, for example, for safe guarding medication in pill bottles from excessive thermal exposure. The safe guard would be an integral part of the label on the bottle. In this embodiment the opaque printing 20 is a warning message preferably pre-printed on a white direct thermal label 10 using opaque white ink. The white on white printing is initially invisible. When the label 10 is exposed to excessive temperature the entire label images, or turns dark. The initially invisible white printing 20 becomes visible. This is shown in FIGS. 1 and 2. The activation temperature when the label 10 turns dark can be selected based on requirements for safe guarding particular medication in containers to which the label 10 is applied.

The white warning message or printing 20 may be optimally placed on a portion of the label not thermally imaged by thermal printing 30 or printed with logo 40. This is depicted in FIG. 1. However by adjusting the opacity of the white ink it is possible to place the invisible print 20 on areas 30 of the label 10 that are thermally printed if desired. This can be accomplished by adjusting the opacity of the white to allow the thermally imaged areas 30 to appear gray through the white pre-printing. As long as the thermal printing is sparse an observer will not detect the hidden message 20 before heat activation.

The activation temperature for revealing the hidden message 20 can be adjusted by changing the thermal sensitivity of the label 10. The substantially opaque white message 20 may be applied over a protective layer 25 as desired. Alternatively, or in addition, a substantially transparent protective layer 25 may be applied to the label 10 on top of the printing 20. The label 10 is not limited to white thermal paper and the hidden message 20 is not limited to white opaque ink. Other colors of paper and inks may be used. Similarly, the label 10 is not limited to black thermal imaging, other imaging colors being possible.

In another application of a thermal label or thermal paper 10, the hidden message 20 could be used as a security feature. When the paper 10 is thermally printed an area can be intentionally thermal printed to expose the hidden print 20, authenticating the media.

The foregoing description above presents a number of specific embodiments or examples of a broader invention. The invention is also carried out in a wide variety of other alternative ways which have not been described here. Many other embodiments or variations of the invention may also be carried out within the scope of the following claims.

Figure 3:
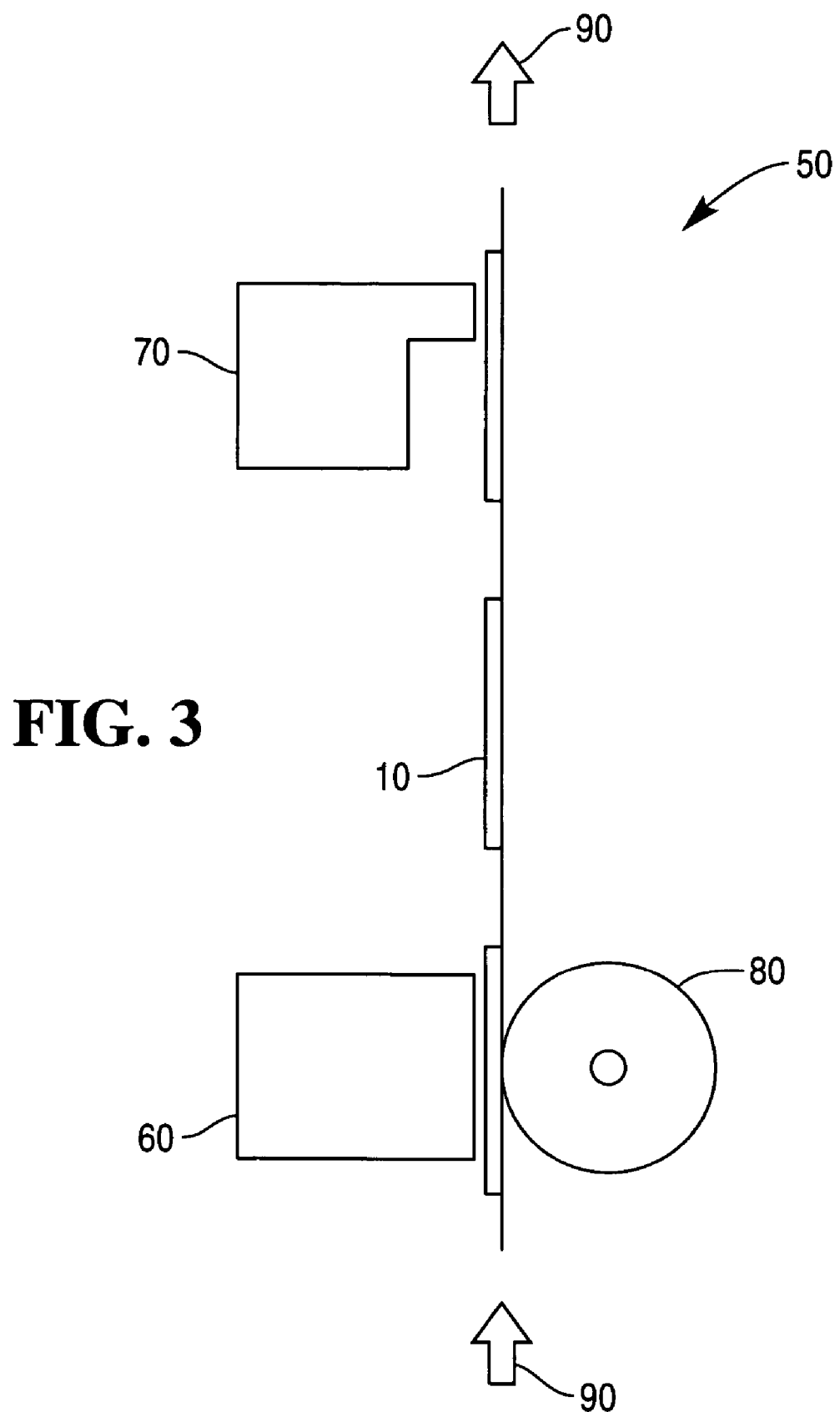
FIG. 3 shows schematically a direct thermal printer with an ink jet print head.

As shown in FIG. 3, a printer 50 for printing of time-temperature indicator labels 10 can be constructed using a direct thermal printing print head 60 to print first indicia 30 on the labels 10, and an ink jet print head 70 to print second indicia 20 on the labels 10, using well known print head technologies. The printer 50 includes a platen 80 opposing the thermal print head 60 and the labels 10 are presented for printing on a web moving through the printer 50 along a feed path 90. Such a printer 50 would comprise a supply of ink (not shown) for the ink jet print head 70, where the ink is of a color that substantially matches that of the thermal media elements 10 prior to activation due to excessive heat.

What is claimed is:

1. A thermal media element comprising a background area of thermally activated material that changes color upon exposure to heat, the background area having an initial color that matches hidden opaque printing before exposure to heat, and an applied colored ink for the hidden opaque printing having the initial color and the ink remains invisible until exposure to the heat changes the initial color of the background area but does not change the initial color of the ink, which remains the initial color.

2. The thermal media element of claim 1 further comprising a protective layer, wherein said ink is applied over a said protective layer.

3. The thermal media element of claim 1 further comprising a protective layer, wherein said protective layer is applied over said ink.

4. The thermal media element of claim 1 in which said ink is opaque.

5. The thermal media element of claim 1 in which said background area is white in color and said ink is an opaque white ink.

6. The thermal media element of claim 5 in which said background area turns black when said thermally activated material is exposed to heat.

7. The thermal media element of claim 1 in which said ink is applied to said background area, and the color of said ink substantially matches the color of said background area before said background area is thermally activated.

8. The thermal element of claim 7 comprising a label in which said ink is in printing that forms visible indicia when said background area is thermally activated.

9. The thermal element of claim 7 in which said background area is printed forming first indicia by direct thermal printing.

10. The thermal element of claim 9 in which said background area is printed forming second indicia by ink jet printing with said colored ink.

11. The thermal element of claim 10 comprising a label, wherein said label is a temperature exposure indicator in which said second indicia are substantially invisible when printed and are visible when said background area is thermally activated.

12. A pharmacy label for a medication container for temperature-sensitive medications, comprising a background including a thermally sensitive coating on a substrate, the thermally sensitive coating having an initial color of white, where said thermally sensitive coating changes color upon exposure to heat to reveal an applied ink that remains the initial color of white when the thermally sensitive coating changes color upon exposure to the heat to reveal a background for the label of a different color from that of white.

13. A thermal media element comprising a thermally sensitive coating on a substrate, where said thermally sensitive coating changes color from an initial color to a second color upon exposure to heat; and a security feature in the form of invisible opaque indicia over said coating, where said indicia becomes visible in the initial color when said coating is exposed to heat and changes to the second color to reveal a background for the substrate having the second color.

14. A thermal media element comprising a background area of thermally activated material having an initial color of white and that changes color upon exposure to heat, and an applied colored ink having the initial color of white, the opacity of said ink allowing direct thermal printing over said ink to be visible through said ink, the background area becoming a color other than white with printing being revealed in the initial color of white.

\* \* \* \* \*